(12) United States Patent
Garimella et al.

(10) Patent No.: US 12,705,107 B2
(45) Date of Patent: Aug. 11, 2026

(54) DEPLOYING APPLICATION CONTAINERS OF A DISTRIBUTED SERVICE

(71) Applicant: Salesforce, Inc., San Francisco, CA (US)

(72) Inventors: Anila Kumar Garimella, Milpitas, CA (US); Hemanth Siddulugari, Dublin, CA (US)

(73) Assignee: Salesforce, Inc., San Francisco, CA (US)

( * ) Notice: Subject to any disclaimer, the term of this patent is extended or adjusted under 35 U.S.C. 154(b) by 968 days.

(21) Appl. No.: 17/933,346

(22) Filed: Sep. 19, 2022

(65) Prior Publication Data

US 2024/0095085 A1 Mar. 21, 2024

(51) Int. Cl.
*G06F 9/50* (2006.01)
*G06F 8/60* (2018.01)

(52) U.S. Cl.
CPC .............. *G06F 9/5055* (2013.01); *G06F 8/60* (2013.01)

(58) Field of Classification Search
CPC ........................................ G06F 9/45533–5094
See application file for complete search history.

(56) References Cited

U.S. PATENT DOCUMENTS 10,915,349 B2 2/2021 Ranjan et al.
11,698,838 B1 * 7/2023 Kurata ................ G06F 11/1469 711/162
2020/0034258 A1 * 1/2020 Avraham ............ G06F 11/2094
2021/0064442 A1 * 3/2021 Alluboyina ........... G06F 9/5011
2021/0240369 A1 * 8/2021 Cain ..................... G06F 3/0679
2021/0279088 A1 * 9/2021 Kochavara .......... G06F 9/45558
2022/0116285 A1 * 4/2022 Abdollahi Vayghan ..................... H04L 41/0668
2022/0229605 A1 * 7/2022 Degwekar ............ G06F 3/0604

(Continued)

OTHER PUBLICATIONS

Kubernetes Cluster Over-Provisioning: Proactive App Scaling Ajit Vedpathak linkedin.com/pulse/kubernetes-cluster-over-provisioning-proactive-app-ajit-vedpathak (Year: 2020).*

(Continued)

*Primary Examiner* — April Y Blair
*Assistant Examiner* — Paul V Mills
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to deploying application containers. A computer system may receive a request to deploy an application container onto resources of a target environment such that program code of the application container is executed. The deployment of the application container may be carried out in a mode in which the computer system does not allocate resources for the application container. The computer system may receive a request to deploy a placeholder container in the target environment. The deployment of the placeholder container may be carried out in a different mode in which the computer system allocates resources for the placeholder container. The computer system may cause an allocation of additional resources to the target environment on which to execute program code of the placeholder container. In response to the additional resources being allocated, the computer system may deploy the application container onto the additional resources for execution.

19 Claims, 7 Drawing Sheets

(56) References Cited

U.S. PATENT DOCUMENTS

| | | | | |
|---|---|---|---|---|
| 2022/0350490 | A1* | 11/2022 | Litke | G06F 3/065 |
| 2023/0071714 | A1* | 3/2023 | Huo | G06F 9/45558 |

OTHER PUBLICATIONS

Provisioning Kubernetes Local Persistent Volumes Ian Chakeres; Published: No later than Feb. 27, 2022 web.archive.org/web/20220629225548/https://engineering.salesforce.com/provisioning-kubernetes-local-persistent-volumes-61a82d1d06b0/ (Year: 2022).*

Provisioning spare capacity in GKE Autopilot withplaceholder balloon pods William Denniss wdenniss.com/gke-autopilot-spare-capacity (Year: 2021).*

Kubernetes: Lifecycle of a Pod Harshal Shah dzone.com/articles/kubernetes-lifecycle-of-a-pod (Year: 2017).*

Cluster overprovisioning in Kubernetes Michael Seiwald medium.com/scout24-engineering/cluster-overprovisiong-in-kubernetes-79433cb3ed0e (Year: 2019).*

Deploying Kafka on Kubernetes with Local storage using Strimzi Jakub Scholz (Year: 2018).*

Introduction to Kubernetes Alex Palesandro, Marco Iorio jwlss.pw/course_notes/cloud_labs/Lab%2003%20-%20Kubernetes.pdf (Year: 2022).*

Container Service for Kubernetes—Best Practices Alibaba Cloud, Document Version: Jul. 5, 2022 (Year: 2022).*

"Pods," https://kubernetes.io/docs/concepts/workloads/pods/; Last modified Sep. 1, 2022; © 2022 The Kubernetes Authors, 33 pages.

"Persistent Volumes," https://kubernetes.io/docs/concepts/storage/persistent-volumes/; Last modified Jun. 16, 2021; © 2022 The Kubernetes Authors, 19 pages.

"Volumes," https://kubernetes.io/docs/concepts/storage/volumes/; Last modified Aug. 9, 2022; © 2022 The Kubernetes Authors, 20 pages.

* cited by examiner

DEPLOYING APPLICATION CONTAINERS OF A DISTRIBUTED SERVICE

BACKGROUND

Technical Field

This disclosure relates generally to computer systems and, more specifically, to various mechanisms for deploying application containers.

Description of the Related Art

Many companies are now shifting from deploying their applications on a local infrastructure to deploying their applications on a cloud infrastructure provided by a cloud provider, such as Amazon™. The cloud provider often provisions virtual machines (VMs) and external storage to be utilized by applications that are deployed (as application containers) onto those VMs. An application container (or, simply "container") comprises a set of applications and their dependencies, all of which are packaged into a portable, self-sufficient unit. Once an application container is created, it can be deployed onto a VM such that the application(s) included in the container is executed. In various cases, a large-scale deployment system, such as Kubernetes™, is used to automate the deployment, scaling, and management of application containers across multiple VMs. A large-scale deployment system can maintain information about the resources (e.g., VMs and external storages) available to it and utilize that information to deploy application containers onto those resources.

Modern systems routinely enable users to store a collection of information as a database that is organized in a manner that can be efficiently accessed and manipulated. In many cases, the data of that database is stored within a database store that is implemented and managed by a storage service. A database service typically processes database transactions to read and write data while the storage service works to ensure that the results from those database transactions are stored in the database store in a manner that can be efficiently accessed. The storage service can comprise multiple storage applications that enable data to be accessed more efficiently and that serve to prevent data loss by replicating data.

DETAILED DESCRIPTION

Figure 1:
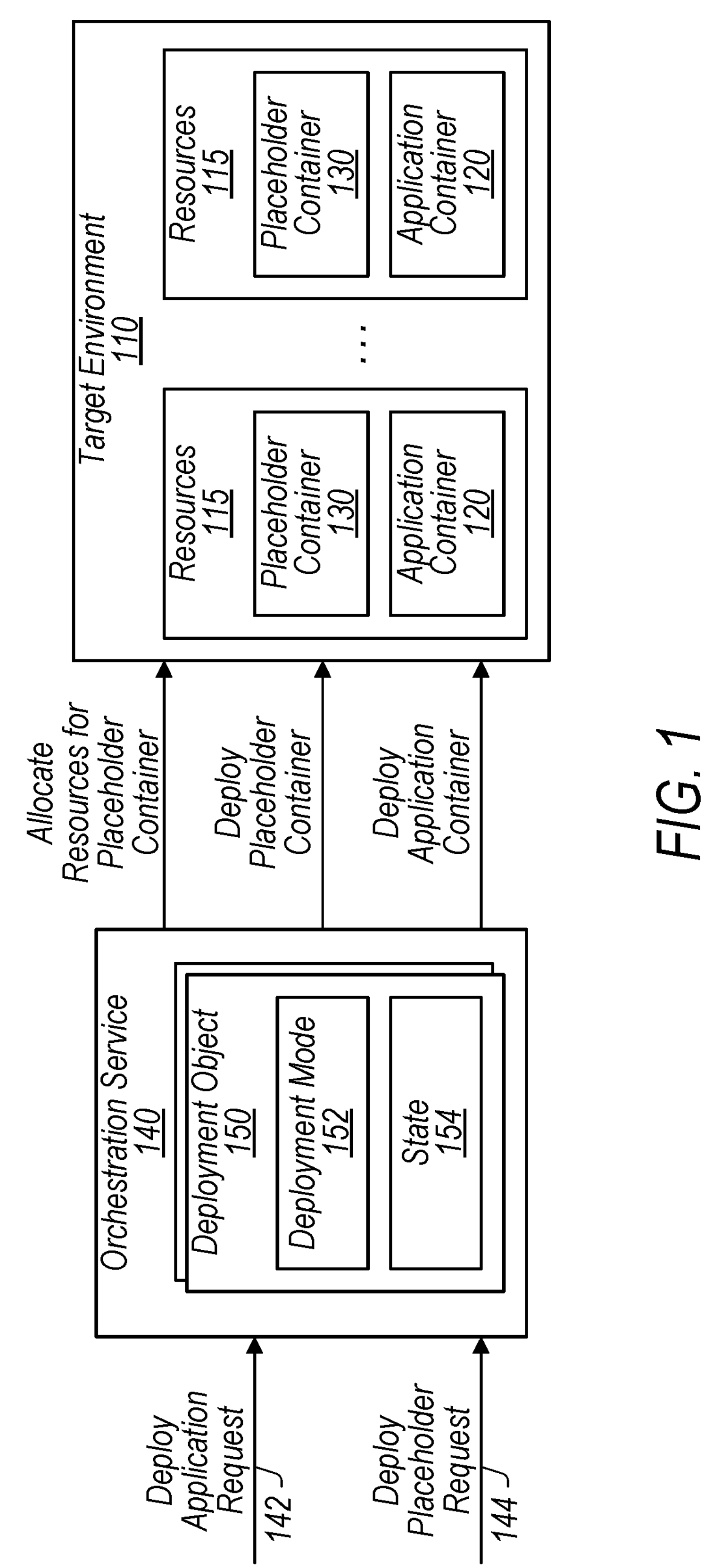
FIG. 1 is a block diagram illustrating example elements of a system that includes a target environment and an orchestration service capable of deploying an application container to the target environment, according to some embodiments.

A storage service (e.g., Apache BookKeeper) is one of multiple services that may be moved from a company's local infrastructure onto a cloud infrastructure provided by a cloud provider. In order to deploy that storage service, an orchestration system, such as Kubernetes, can be used to deploy the storage applications that together implement the storage service onto the resources provided by the cloud infrastructure. For example, Kubernetes can interact with cloud computing services (e.g., Amazon Web Services™) to provision a virtual machine (VM) and an external storage (e.g., an Amazon Elastic Block Store (EBS) volume) that is external to the computer system on which the VM executes. Accordingly, Kubernetes can deploy a storage application onto the VM and enable the storage application to use the external storage. In many cases, the VM is also connected to a local storage (e.g., a local disk of the computer system on which the VM executes) that provides quicker access to data than the external storage and thus can be used as a cache. As such, a storage application can store data at the local storage during its operation. An issue arises, however, if the storage application crashes and is not coupled to the VM since Kubernetes is likely to deploy that storage application on a different VM with a different local storage. As a result, the work spent filling the local storage of the former VM is worthless as the storage application is not able to use that local storage anymore. It may thus be desirable to couple a storage application server to a VM.

An application can be coupled to a VM through Kubernetes objects. In the Kubernetes context, a storage volume (e.g., a storage area of a solid-state disk) can be logically represented by a particular type of Kubernetes object that is called a persistent volume object (or simply, a persistent volume). A persistent volume can include information about the underlying storage volume, such as its type, storage size, and access path. An application can be associated with a persistent volume claim (PVC) object (or simply, PVC) that identifies the type and the size of the storage desired by that application—PVCs are another type of Kubernetes object. When Kubernetes identifies a persistent volume that meets the requirements of a PVC, Kubernetes binds the persistent volume to the PVC. Consequently, the application is permitted to use that volume. If that volume is a local storage of a VM, then Kubernetes will deploy the application onto that VM since the application's PVC is bound to the persistent volume representing the local storage.

When an application is being readied for deployment, Kubernetes may create the PVC for the application based on information provided for deploying that application. The PVC can include information specifying storage size, access mode (e.g., rw, ro, etc.), and references to a storage class that controls how to provision an external storage persistent volume. To provision the external storage volume, the Dynamic Volume Provisioner Kubernetes plugin from Amazon Web Services (for example) will communicate with Amazon Web Services in order to provision the external storage volume. The provisioning of a VM is facilitated by Cluster Autoscaler (a Kubernetes service) when there is an application pod in a pending state in which the application awaits to be deployed. The pending state can be indicated by a deployment object that is created for the deployment of that application. To provision the VM, Cluster Autoscaler may communicate with Amazon Web Services (for example) in order to provision the VM, and as part of that process, Amazon Web Services may provision a VM. The provisioned external storage persistent volume may then be mounted to the provisioned VM to make it available to the application via a PVC binding. Note that a persistent volume is created for the external storage by Dynamic Volume Provisioner but not for the local storage that is available in the VM. But as mentioned, it might be desirable to use the local storage as a cache for a storage application of a storage service.

In various embodiments, when a VM is provisioned, a local volume provisioner (LVP) application can be deployed onto that VM to discover its local storage and to create a persistent volume for the local storage. Since it may be desirable for a storage application to use the local volume of a node instead of an external volume, the storage application can be set up to request the local volume by configuring its storage class provisioner field to a certain mode, which can be referred to herein as the "no provisioner" mode. But Cluster Autoscaler does not understand this no provisioner mode and thus does not communicate with the cloud provider to provision a VM. Because a VM is not provisioned, the LVP application cannot be deployed onto the VM to create a persistent volume and thus the PVC of a storage application cannot be bound to the non-existent persistent volume. As a result, that storage application remains in a pending state indefinitely. The present disclosure addresses, among other issues, how to ensure that a VM is provisioned whose local volume can be utilized by an application when the application is to be deployed under the no provisioner mode.

In various embodiments described below, a system comprises a target environment and an orchestration service that can deploy application containers onto resources that are included within the target environment. That orchestration service may receive a request to deploy, for a distributed service (e.g., a storage service), an application container onto a set of resources of the target environment such that the application of the application container is executed to implement at least a portion of that distributed service (e.g., to implement a storage application that supports the storage service). In various embodiments, the orchestration service generates a deployment object that indicates the state of the deployment of the application container. The application container is set to deploy in a first mode (e.g., a no provisioner mode) in which the orchestration service does not allocate resources for the application container's deployment. In various embodiments, the orchestration service receives a request to deploy, for a placeholder service, a placeholder container onto resources of the target environment. The deployment of the placeholder container is carried out in a second mode (e.g., a "provisioner" mode) in which the orchestration service allocates resources for the placeholder container's deployment. Thus, the orchestration service may allocate an additional set of resources (e.g., a VM and an external storage) to the target environment (e.g., by communicating with a cloud provider) on which to execute the placeholder container. In response to the additional set of resources being allocated, the orchestration service deploys the application container of the distributed service onto those additional resources for execution. As discussed in more detail below, the orchestration service may deploy an LVP application onto a VM included in the additional set of resources to create a persistent volume that can be bound to a PVC associated with the application container such that the application container can utilize a local volume of the VM. While storage applications are discussed throughout the present disclosure, these techniques can be applied to other types of applications, such as database applications.

These techniques may be advantageous as they enable an application to be deployed in a particular deployment mode that permits the application to utilize a particular resource (e.g., a local volume that is associated with a VM) even when the particular deployment mode does not facilitate the allocation of that particular resource. For example, a storage application may be designed to utilize the local volume of a VM as a cache, but the deployment of that storage application may not cause the VM and its local volume to be allocated. Accordingly, by using a placeholder application to cause an orchestration service (e.g., Kubernetes) to deploy a VM, a local volume can be made available to the storage application despite its deployment mode. Moreover, a storage service may be allowed to scale up as a placeholder service can be scaled in proportion to the storage service in order to provide additional VMs with local volumes that can be used by new deployments of storage applications of the storage service. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a target environment 110 (having resources 115) and an orchestration service 140. As shown, application containers 120 and placeholder containers 130 are deployed onto resources 115, and orchestration service 140 includes deployment objects 150 that specify a deployment mode 152 and a state 154. In some embodiments, system 100 is implemented differently than shown. As an example, as discussed in greater detail with respect to FIG. 3A, there may be a cloud provider that provisions resources 115 to target environment 110.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases, and entities (e.g., a third-party system) that are associated with system 100. In various embodiments, system 100 is implemented using a cloud infrastructure provided by a cloud provider. Thus, orchestration service 140, application containers 120, and/or placeholder containers 130 may execute on and use the available cloud resources of the cloud infrastructure (e.g., computing resources, storage resources, network resources, etc.) to facilitate their operation. As an example, an application container 120 may execute in a virtual environment hosted on server-based hardware included within a datacenter of a cloud provider. But in some embodiments, system 100 is implemented utilizing local or private infrastructure as opposed to a public cloud.

Target environment 110, in various embodiments, is a collection of resources 115 that are available for implementing services (e.g., a database service, a storage service, etc.). Target environment 110 may correspond to cloud infrastructure provided by a cloud provider and may be available to a particular tenant (e.g., a company). In some embodiments, target environment 110 is made available to multiple tenants but provides isolation such that the data of one tenant is not exposed (without authorization) to another tenant. For example, target environment 110 may correspond to the cloud computing platform provided by Amazon Web Services™, which is made available to multiple tenants. Resources 115, in various embodiments, include storage resources, networking resources, and computing resources. As an example, resources 115 may include VMs executing on hardware of a cloud provider and storage volumes implemented via storage disks provided by that cloud provider. But in some embodiments, target environment 110 is implemented using a private infrastructure managed by the entity that deploys containers 120 and 130.

An application container 120, in various embodiments, comprises an application (e.g., a storage server) and its dependencies, all of which are packaged into a portable, self-sufficient unit. Once an application container 120 is created, it can be deployed onto a VM such that the container's application is executed. While containers and VMs are discussed in this disclosure, in some embodiments, an application can be installed on a computer system and then executed without virtualization or containerization. In order to deploy a service, in various embodiments, a set of application containers 120 that include the application(s) for implementing that service are deployed onto resources 115. For example, to deploy a distributed storage service, multiple application containers 120, each having a storage application, may be deployed onto VMs that are provisioned to target environment 110. As discussed below, containers 120 and 130 can be deployed using orchestration service 140.

A placeholder container 130, in various embodiments, is a container whose deployment allows for one or more application containers 120 to be deployed. A placeholder container 130 may include an application that provides a service, a dummy application that does not provide any meaningful functionality, or no application at all. In various embodiments, the deployment of a placeholder container 130 can cause a set of additional resources 115 to be provisioned to target environment 110 on which to deploy an application container 120. The deployment of a placeholder container 130 may occur under a first deployment mode 152 that is different than a second deployment mode 152 used for an application container 120. The difference in their deployment modes 152 causes resources 115 to be provisioned for a placeholder container 130 but not an application container 120 during their respective deployments.

Orchestration service 140, in various embodiments, is a service that can orchestrate the deployment of containers 120 and 130 onto resources 115. Kubernetes™ is an example of an orchestration service 140 and is a platform capable of automating the deployment, scaling, and management of containerized applications. These capabilities are facilitated via services of the Kubernetes platform that include, but are not limited to, a controller manager, a scheduler, and an application programming interface (API) service. In the Kubernetes context, the controller manager is responsible for running the controllers that interact with the platform, the scheduler is responsible for ensuring that containers have been assigned to a node (e.g., a VM), and the API service exposes the Kubernetes API to users, controllers, and nodes (e.g., the agents that are running on the nodes) so that they can communicate with the Kubernetes platform and with one another. In various embodiments, deploy application requests 142 and deploy placeholder requests 144 are received (e.g., from users) via the API service.

To handle the deployment, scaling, and management of containerized applications, the Kubernetes platform stores entities called objects. One example object is a deployment object 150 that serves as a "record of intent" describing a desired state for a deployment. For example, a deployment object 150 may represent a user's request to deploy a service or an application. In various embodiments, a deployment object 150 identifies an object specification and a state 154. An object specification identifies characteristics of the desired state of a deployment, such as the container(s) 120 or 130 to be deployed, the resources (e.g., network, storage, etc.) to be made available, and the deployment mode 152 to be used. While the deployment mode 152 is shown as part of a deployment object 150, in various embodiments, the deployment mode 152 is specified in a Kubernetes object called a persistent volume claim (PVC). The PVC describes the resources requested for a containerized application and is bound to the relevant deployment object 150. Thus, the above contents may be included within a single object (e.g., a deployment object 150) or spread across multiple objects (e.g., a deployment object 150 and a PVC). State 154, in various embodiments, identifies the state of the deployment, such as pending or active. During the pending state, a container 120 or 130 might be waiting for particular resources 115 to be available that facilitate the operation of the containers. Once a container 120 or 130 has deployed and is active, the state 154 for that container 120/130 may be updated to "active." In some embodiments, state 154 may specify specific details about a deployment. As an example, if a multi-application service is being deployed onto resources 115, then the state 154 for that deployment may indicate which applications have been deployed and which are still pending.

During operation, orchestration service 140 may receive a deploy application request 142 to deploy an application container 120. That request may specify characteristics pertaining to that application container 120, such as the application to deploy and the resources 115 to be used by the application. Orchestration service 140 may create a deployment object 150 based on the information in the deploy application request 142—in some cases, that request provides the deployment object 150—and set the state 154 of that deployment object 150 to pending. If the resources 115 that are requested for the application container 120 are not available in target environment 110, then that application container 120 remains in a pending state. Orchestration service 140 does not allocate resources 115 for the application container 120 if the deployment mode 152 for the application container 120 does not facilitate it. Orchestration service 140 may receive a deploy placeholder request 144 to deploy a placeholder container 130. Accordingly, orchestration service 140 may create (or receive) a deployment object 150 for the placeholder container 130. If the resources 115 that are requested for the placeholder container 130 are not available in target environment 110, then orchestration service 140 may allocate the requested resources 115 as the deployment mode 152 for the placeholder container 130 may facilitate it. Orchestration service 140 may then deploy the placeholder container 130 onto those allocated resources 115. In many cases, the allocated resources 115 include resources 115 requested for application container 120. Orchestration service 140 may detect that the application container 120 is pending and that its requested resources 115 are available. As such, orchestration service 140 may deploy the application container 120 onto the resources 115 that were provisioned for the placeholder container 130. Accordingly, the deployment of the placeholder container 130 facilitates the deployment of the application container 120.

Figure 2:
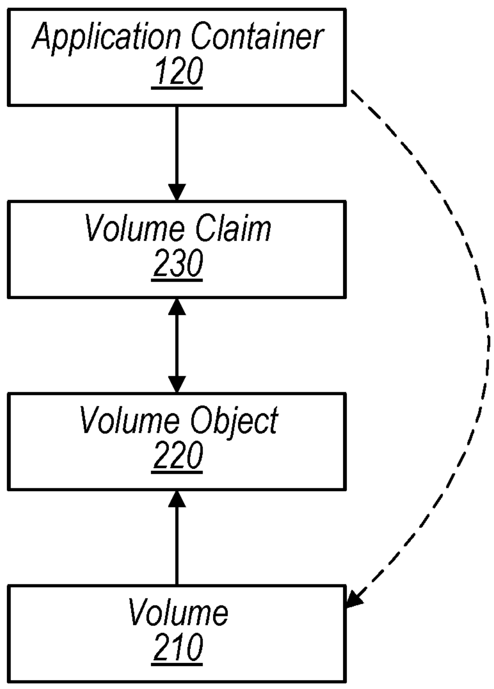
FIG. 2 is a block diagram illustrating example elements that can be involved in a binding of an application container to a volume, according to some embodiments.

Turning now to FIG. 2, a block diagram of example elements that permit an application container 120 to be bound to a volume 210 is shown. In the illustrated embodiment, there is an application 120, a volume 210, a volume object 220, and a volume claim 230. While not shown, a volume claim 230 may be a part of a deployment object 150 of an application container 120, or it may be separate from the deployment object 150 but still associated with that application container 120. For example, a deploy application request 142 may specify a deployment object 150 and a separate volume claim 230 for an application container 120.

A volume 210, in various embodiments, is a storage area that is usable for storing and accessing data. For example, a volume 210 may be a storage device (e.g., a disk) formatted to store directories and files—thus a volume 210 may be associated with a file system. In various embodiments, a volume 210 is a Non-Volatile Memory Express (NVMe) drive that is available via a VM, although a volume 210 can correspond to any one of a variety of different storage devices (e.g., a hard disk) and be available through other mechanisms. As such, once deployed on that VM, an application container 120 may access that volume 210 through an access path and store its data at the volume 210. In some cases, a volume 210 can be a storage volume that is external to a VM but accessible to an application container 120 (or a placeholder container 130) once deployed on that VM.

A volume object 220, in various embodiments, is an object representing a volume 210 and includes information about the volume 210, such as its type, size, access path, etc. In some embodiments, each resource 115 in target environment 110 that may be used by orchestration service 140 is represented by an object understood by orchestration service 140. Consequently, volume objects 220 can allow for orchestration service 140 to determine what storage resources exist in target environment 110 and are available for use by containers 120 and 130 that have not yet been deployed. When a storage resource 115 is provisioned to target environment 110, in various embodiments, orchestration service 140 (or, in some cases, a cloud service who may have provisioned the storage resource 115) creates a volume object 220 for that resource 115. As discussed in greater detail with respect to FIG. 4B, orchestration service 140 may deploy a provisioner program to create a volume object 220 for a local volume 210 of a VM.

A volume claim 230, in various embodiments, is an object that corresponds to a request for storage resources (e.g., a volume 210). A volume claim 230 may be specified by a user and linked to a container 120 or 130 via the container's deployment object 150, which may include the volume claim 230 or reference it. In various embodiments, a volume claim 230 identifies the type and the size of the storage resources desired by a container 120 or 130. Consequently, when deploying a container 120 or 130, orchestration service 140 determines, from its volume objects 220, whether there are available volumes 210 within target environment 110 that satisfy the requirements specified in a volume claim 230 corresponding to that container. If there is a set of available volumes 210 that satisfy that volume claim 230, then orchestration service 140 may bind the set of volume objects 220 (representing those volumes 210) to that volume claim 230 (e.g., via a reference from a volume object 220 to the volume claim 230 and/or vice versa). As a result, the container 120/130 may utilize the underlying set of volumes 210, which it may access using the information (e.g., the access path) specified in the corresponding set of volume objects 220.

Figure 3A:
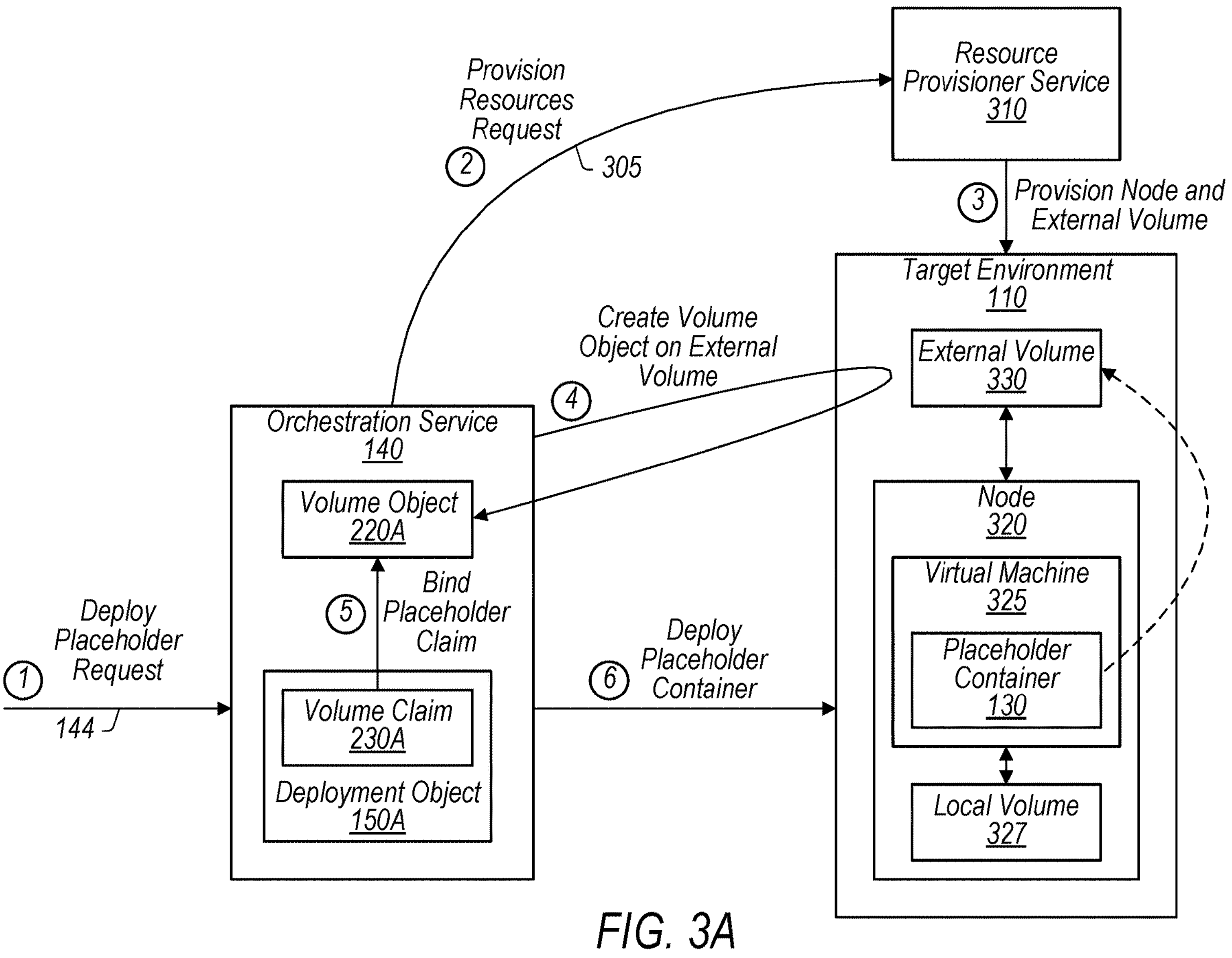
FIG. 3A-C are block diagrams illustrating example elements of a process for deploying an application container to a target environment, according to some embodiments.
Figure 3B:
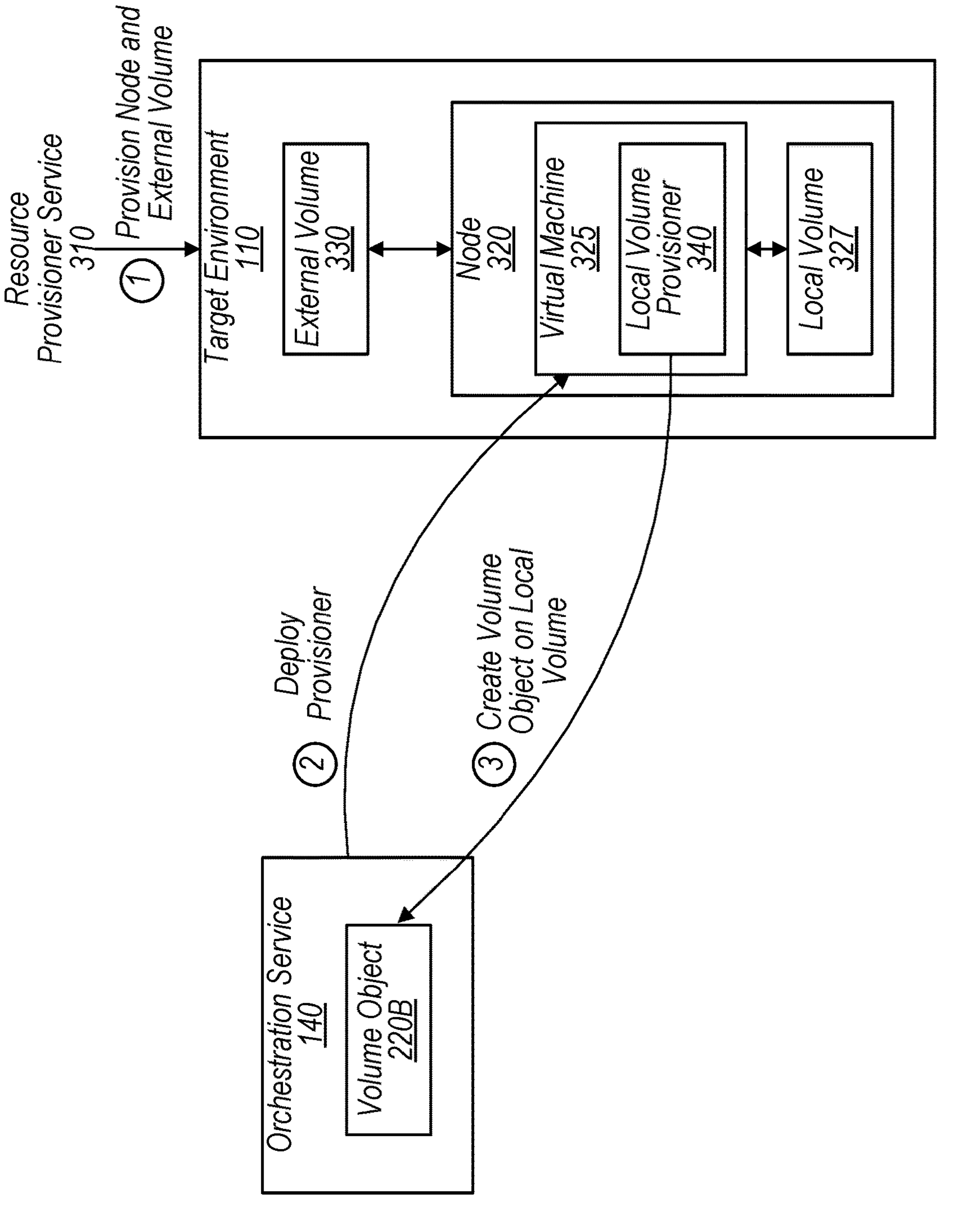
Figure 3C:
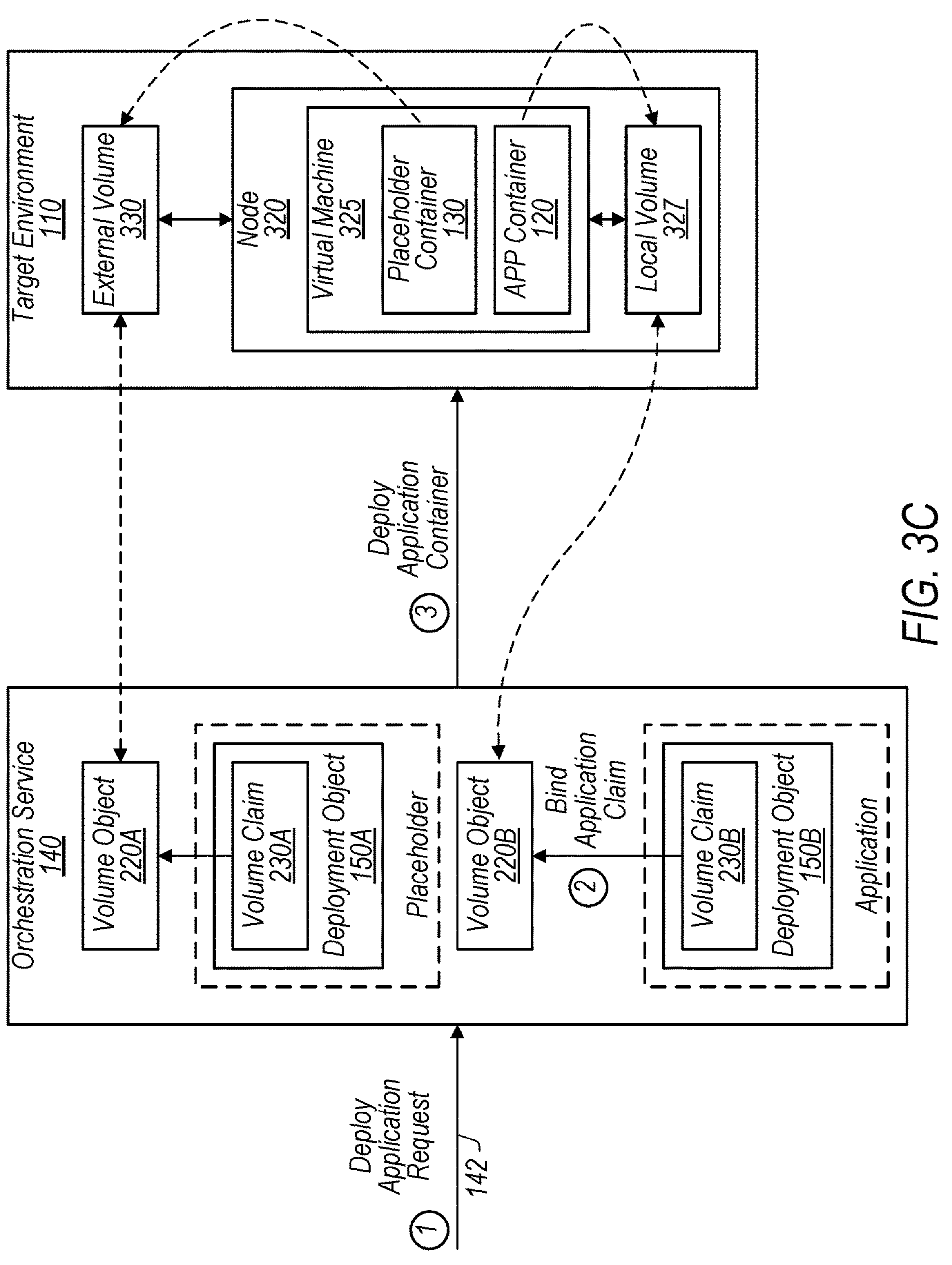

Turning now to FIGS. 3A-C, block diagrams of example elements involved in a process for deploying an application container 120 into target environment 110 are shown. In FIG. 3A, there is target environment 110, orchestration service 140, and a resource provisioner service 310. The illustrated embodiment might be implemented differently than shown. For example, orchestration service 140 may implement the functionality of resource provisioner service 310 and thus resource provisioner service 310 might not be involved in the illustrated process.

As depicted, orchestration service 140 receives a deploy placeholder request 144. That request 144 may include a deployment object 150A corresponding to the placeholder container 130 being deployed or information for creating deployment object 150A. Orchestration service 140 stores deployment object 150A as shown, although it may be stored externally. Since the placeholder container 130 has not been deployed, its state 154 can be set to pending. In various embodiments, orchestration service 140 routinely checks the states 154 of deployment objects 150 to determine if there are any in the pending state. Consequently, orchestration service 140 may observe that the state 154 of deployment object 150A indicates that the deployment of the placeholder container 130 is pending. In response, orchestration service 140 may determine if there are available resources 115 (e.g., by examining volume objects 220) on which to deploy the placeholder container 130. If there are sufficient resources 115, then orchestration service 140 may bind the placeholder container 130 to the desired resources 115 (e.g., bind deployment object 150A to a volume object 220) and then deploy it onto those resources 115. In various embodiments, if there is not a sufficient amount of available resources 115 for the placeholder container 130, then orchestration service 140 determines how to proceed with the deployment based on the deployment mode 152 specified by deployment object 150A.

As mentioned, in various embodiments, there are at least two deployment modes 152 for deploying a container 120 or 130. The first deployment mode may be a dynamic provisioner mode that uses dynamic provisioning plugins implemented by a resource owner (e.g., resource provisioner service 310) to provision resources 115 to target environment 110. Orchestration service 140 (or the resource owner) may further create volume objects 220 for those resources 115. The second deployment mode may be a static provisioner mode that relies on the existence of already provisioned resources 115 and thus does not cause resources 115 to be provisioned to target environment 110. In various embodiments, placeholder containers 130 are deployed under the first deployment mode and application containers 120 are deployed under the second deployment mode. Accordingly, in response to there not being sufficient resources 115 for the placeholder container 130, orchestration service 140 issues a provision resources request 305 to resource provisioner service 310, as shown.

Resource provisioner service 310, in various embodiments, is a service or platform that manages resources 115, including the provisioning of resources 115 to target environment 110. Amazon Web Services is an example of resource provisioner service 310. Accordingly, target environment 110 may correspond to the cloud infrastructure that is provided by Amazon Web Services. After receiving a provision resources request 305, in various embodiments, resource provisioner service 310 allocates a node 320 and an external volume 330 to target environment 110. A node 320, in various embodiments, can be hardware or a combination of hardware and software. In the illustrated embodiment, node 320 includes a local volume 327 (which may be a type of volume 210 and implemented by an NVMe drive) and a virtual machine 325 on which the placeholder container 130 can be deployed. In various embodiments, an external volume 330 is a block-level storage device that is external but attached to a node 320. Consequently, software that is executing on a node 320 may access the external volume 330 attached to that node 320 to read and write data.

After a node 320 and an external volume 330 have been provisioned or as a part of the provisioning process, in various embodiments, a volume object 220 is created for that external volume 330. As shown for example, orchestration service 140 creates volume object 220A for the illustrated external volume 330—in some embodiments, resource provisioner service 310 creates volume object 220A. Based on volume object 220A being created, orchestration service 140 determines that the requirements specified within a volume claim 320A of the placeholder container 130 can be satisfied. As a result, orchestration service 140 binds volume claim 230A to volume object 220A. Consequently, because the requirements of the placeholder container 130 are met and it is permitted to access the external volume 330 as a result of the binding, in various embodiments, orchestration service 140 deploys the placeholder container 130 into the provisioned virtual machine 325, as shown. Once deployed, the application (if there is one) of the placeholder container 130 may execute and utilize the provisioned external volume 330.

Turning now to FIG. 3B. When a node 320 and an external volume 330 are provisioned by resource provisioner service 310, in various embodiments, that node 320 includes a virtual machine 325 and a local volume 327 (e.g., an NVMe disk) that is coupled to the virtual machine 325 and is not external to that node 320. In order for an application container 120 to utilize the local volume 327, orchestration service 140 may deploy a local volume provisioner 340 to the virtual machine 325 to create a volume object 220. Accordingly, local volume provisioner 340, in various embodiments, is an application that is executable to create a volume object 220 for a local volume 327. In some embodiments, local volume provisioner 340 is a part of a set of applications that is deployed onto a new node 320 whenever that node 320 is provisioned to target environment 110. As shown, orchestration service 140 deploys local volume provisioner 340 to the illustrated virtual machine 325. Once deployed, local volume provisioner 340 creates a volume object 220B for the illustrated local volume 327. As discussed with respect to FIG. 3C, orchestration service 140 may then determine to deploy an application container 120 onto the illustrated node 320 as that application container's resource requirements may be satisfied in view of volume object 220B. In some embodiments, orchestration service 140 (or resource provisioner service 310) may create a volume object 220 for a local volume 327 without using local volume provisioner 340.

Turning now to FIG. 3C. As shown in the illustrated embodiment, orchestration service 140 receives a deploy application request 142 to deploy an application container 120 to target environment 110. The deploy application request 142 can be received before or after the deploy placeholder request 144 of FIG. 3A. In some embodiments, a single deploy application request 142 causes the deployment of an application container 120 and a placeholder container 130—thus a deploy placeholder request 144 may not be received. The deploy application request 142 may include a deployment object 150B for the application container 120 or other information that enables orchestration service 140 to generate deployment object 150B.

During operation, orchestration service 140 may observe that deployment object 150B indicates a pending state 154 for the deployment of the application container 120. In response, orchestration service 140 determines whether there exist available resources 115 (e.g., a node 320 and a local volume 327) for the deployment of the application container 120. After volume object 220B is created (as discussed in FIG. 3B), orchestration service 140 may determine that the storage resources corresponding to volume object 220B satisfy the resource requirements of the application container 120. Consequently, in various embodiments, orchestration service 140 binds a volume claim 230B of deployment object 150B to volume object 220B. As a result, the application container 140 is permitted to utilize the illustrated local volume 327 as a storage unit. Since the resources requirements of that application container 130 are met, orchestration service 140 deploys the application container 120 into the provisioned virtual machine 325, as shown. Once deployed, the application of the application container 120 may execute and utilize the local volume 327. The application container 120 can thus utilize the local volume 327 while the placeholder container 130 utilizes the external volume 330. After deploying the application container 120, orchestration service 120 may update the state 154 of deployment object 150B to indicate that the application container 120 has been deployed and its deployment is no longer pending.

In many cases, a node 320 may crash or otherwise fail. Thus, in various embodiments, orchestration service 140 performs garbage collection in which it reviews containers 120 and 130 and their deployment objects 150 and volume objects 220 and deletes volume objects 220 that do not have a backing node 320 or external volume 330 anymore. Deleting a volume object 220 may include deleting the binding between that volume object 220 and a volume claim 230. For example, if the illustrated node 320 crashes, orchestration service 140 may delete volume objects 220A and 220B and their binding to volume claims 230A and 230B, respectively. In response to deleting those bindings or as a part of deleting those bindings, orchestration service 140 may update the state 154 of both deployment objects 150A and 150B to indicate that the deployment of the placeholder container 130 and the application container 120 has returned to the pending state. As a result, in various embodiments, orchestration service 140 reinitiates the process discussed with respect to FIGS. 3A-C—that is, orchestration service 140 communicates with resource provisioner service 310 to provision a new node 320 and a new external volume 330, creates the relevant volume objects 220 and bindings, and again deploys the placeholder container 130 and the application container 120 to target environment 110.

Figure 4:
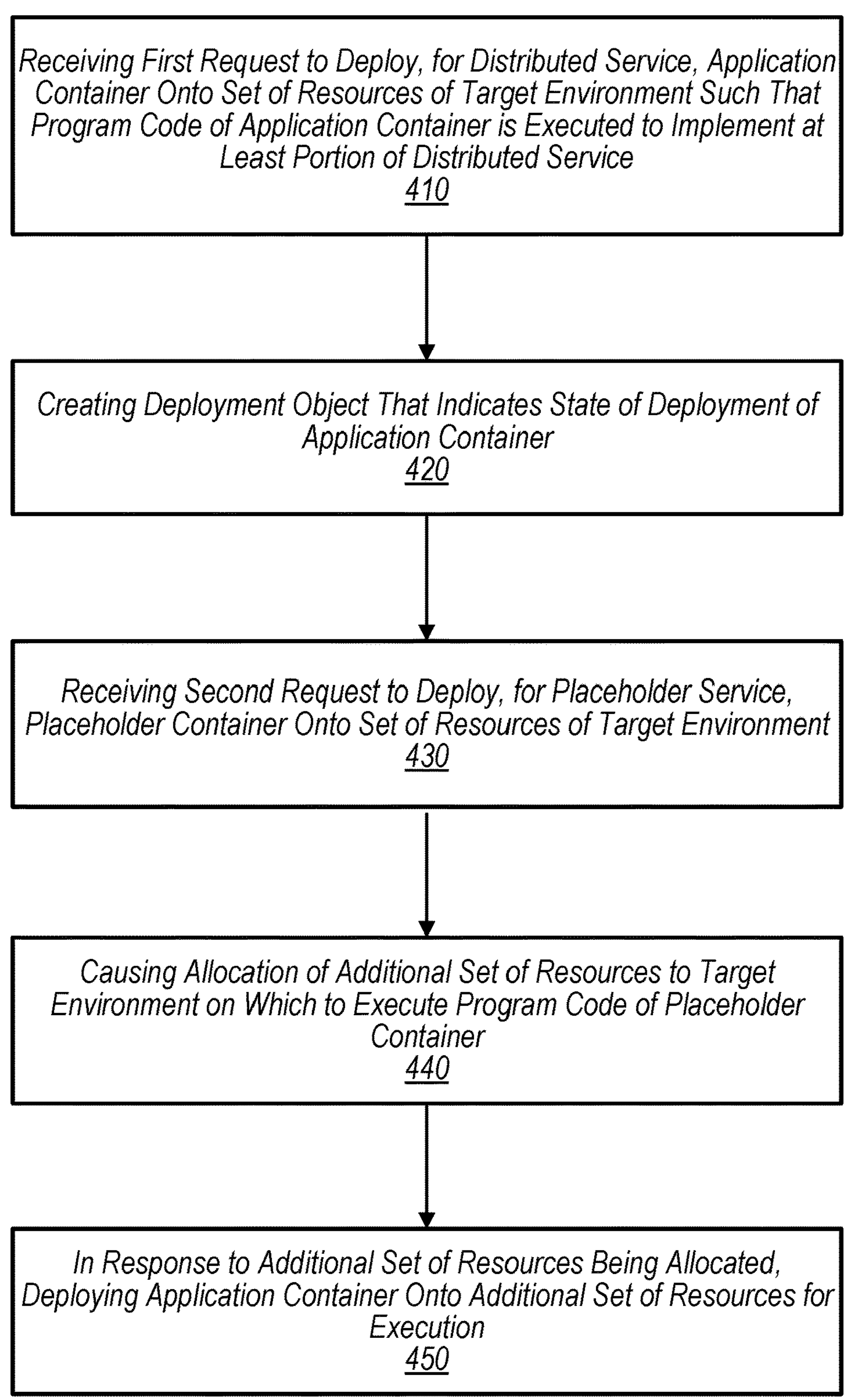
FIG. 4 is a flow diagram illustrating an example method that pertains to deploying an application container onto resources of a target environment, according to some embodiments.

Turning now to FIG. 4, a flow diagram of a method 400 is shown. Method 400 is one embodiment of a method that is performed by a computer system (e.g., system 100) to deploy an application container (e.g., an application container 120). Method 400 can be performed by executing program instructions that are stored on a computer-readable medium. For example, a computer system having at least one processor may execute program instructions stored in a memory of the computer system to perform method 400. Method 400 may include more or less steps or a different ordering of steps that shown. For example, step 430 may occur before steps 410 and 420.

Method 400 begins in step 410 with the computer system receiving a first request (e.g., a deploy application request 142) to deploy, for a distributed service, an application container onto a set of resources (e.g., resources 115) of a target environment (e.g., target environment 110) such that program code of that application container is executed to implement at least a portion of the distributed service. The distributed service is "distributed" in that the instances of the applications (e.g., storage servers) that collectively implement the distributed service are distributed across multiple systems (e.g., multiple nodes within a data center). The distributed service may be a storage service and thus the application container may implement a storage server that is operable to use a local storage (e.g., a local volume 327) of a node (e.g., a node 320) of the target environment as a cache for caching data of a database.

In step 420, the computer system creates a deployment object (e.g., a deployment object 150) that indicates a state (e.g., a state 154) of the deployment of the application container. In various embodiments, the deployment of the application container is carried out in a first mode (e.g., a "no provisioner" mode) in which the orchestration service does not allocate resources for the deployment of the application container. In step 430, the computer system receives a second request (e.g., a deploy placeholder request 144) to deploy, for a placeholder service, a placeholder container (e.g., a placeholder container 130) onto the set of resources of the target environment. In various embodiments, the deployment of that placeholder container is carried out in a second mode (e.g., a "provisioner" mode) in which the orchestration service allocates resources for the deployment of the placeholder container.

In step 440, the computer system causes an allocation of an additional set of resources to the target environment on which to execute program code of the placeholder container. The additional set of resources may include a node on which to deploy the placeholder container and an external storage (e.g., an external volume 330) that is external to the node. Causing the allocation of the additional set of resources may include issuing a set of requests (e.g., provision resource requests 305) to a cloud service (e.g., resource provisioner service 310) to allocate the node and the external storage to the target environment. The target environment may be a part of cloud infrastructure that is managed by the cloud service. In various embodiments, the node includes a local storage, and the application container is operable to utilize the local storage and the placeholder container is operable to utilize the external storage. The computer system may deploy a local-storage-setup application (e.g., local volume provisioner 340) onto the node such that the local-storage-setup application is executed to generate a local storage object (e.g., a volume object 220 on the local storage) that allows for the application container to utilize the local storage. The computer system may bind the deployment object to the local storage object to cause the computer system to redeploy the application container onto the node in response to the application container crashing. In some embodiments, the application container creates a storage object (e.g., a volume claim 230) for the application container and binds the storage object of the application container to the local storage object created by the local-storage-setup application. In other embodiments, the storage object is included in the deployment object and, as a result, the computer system binds the deployment object (via its storage object) to the local storage object, as mentioned above.

In step 450, in response to the additional set of resources being allocated, the computer system deploys the application container onto the additional set of resources for execution. The computer system may detect that the deployment object of the application container indicates a pending state for the deployment of the application container. In response to that detecting, the computer system identifies whether there is an available resource in the target environment on which to deploy the application container. The computer system may identify the additional set of resources as available resources for the application container and deploy the application container on the additional set of resources. After the deploying of the application container, the computer system modifies the deployment object to indicate that the application container has been deployed. In various embodiments, the number of placeholder containers deployed is scaled in proportion to a number of application containers. In some cases, the computer system detects that the node has crashed. Thereafter, the computer system may delete a portion (e.g., the binding of a volume claim 230 to an external volume object 220) of a deployment object created for the placeholder container. The deleting may cause the computer system to allocate another set of additional resources to the target environment.

Exemplary Computer System

Figure 5:
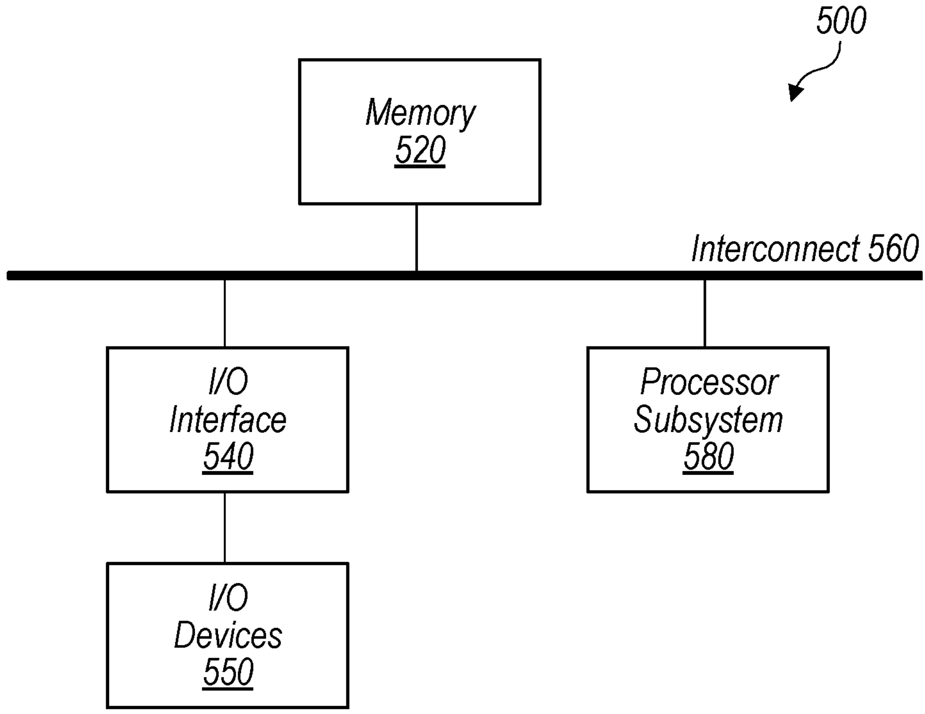
FIG. 5 is a block diagram illustrating elements of a computer system for implementing various systems described in the present disclosure, according to some embodiments.

Turning now to FIG. 5, a block diagram of an exemplary computer system 500, which may implement system 100, orchestration service 140, target environment 110, resource provisioner service 310, and/or node 320, is shown. Computer system 500 includes a processor subsystem 580 that is coupled to a system memory 520 and I/O interfaces(s) 540 via an interconnect 560 (e.g., a system bus). I/O interface(s) 540 is coupled to one or more I/O devices 550. Although a single computer system 500 is shown in FIG. 5 for convenience, system 500 may also be implemented as two or more computer systems operating together.

Processor subsystem 580 may include one or more processors or processing units. In various embodiments of computer system 500, multiple instances of processor subsystem 580 may be coupled to interconnect 560. In various embodiments, processor subsystem 580 (or each processor unit within 580) may contain a cache or other form of on-board memory.

System memory 520 is usable store program instructions executable by processor subsystem 580 to cause system 500 perform various operations described herein. System memory 520 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 500 is not limited to primary storage such as memory 520. Rather, computer system 500 may also include other forms of storage such as cache memory in processor subsystem 580 and secondary storage on I/O Devices 550 (e.g., a hard drive, storage array, etc.). In some embodiments, these other forms of storage may also store program instructions executable by processor subsystem 580. In some embodiments, program instructions that when executed implement orchestration service 140, application container 120, placeholder container 130, and/or virtual machine 325 may be included/stored within system memory 520.

I/O interfaces 540 may be any of various types of interfaces configured to couple to and communicate with other devices, according to various embodiments. In one embodiment, I/O interface 540 is a bridge chip (e.g., Southbridge) from a front-side to one or more back-side buses. I/O interfaces 540 may be coupled to one or more I/O devices 550 via one or more corresponding buses or other interfaces. Examples of I/O devices 550 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 500 is coupled to a network via a network interface device 550 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

receiving, by an orchestration service that is executing on a computer system, a first request to deploy, for a distributed service, an application container onto a set of resources of a target environment such that program code of the application container is executed to implement at least a portion of the distributed service;

storing, by the orchestration service, a deployment object that indicates a state of a deployment of the application container, wherein the deployment of the application container is carried out in a first mode in which the orchestration service does not allocate a node to the target environment on which to execute the application container even when the application container has not been deployed onto the target environment and is associated with a pending state;

subsequent to receiving the first request to deploy the application container, receiving, by the orchestration service, a second request to deploy, for a placeholder service, a placeholder container onto the target environment, wherein a deployment of the placeholder container is carried out in a second mode in which the orchestration service allocates resources that include a node for the deployment of the placeholder container;

causing, by the orchestration service, an allocation of an additional set of resources to the target environment on which to execute program code of the placeholder container; and in response to the additional set of resources being allocated for the placeholder container, the orchestration service deploying the application container onto a node of the additional set of resources for execution.

2. The method of claim 1, wherein the additional set of resources includes an external storage that is external to the node of the additional set of resources, wherein the node of the additional set of resources includes a local storage.

3. The method of claim 2, wherein the application container is operable to utilize the local storage while the placeholder container is operable to utilize the external storage.

4. The method of claim 2, further comprising:

deploying, by the orchestration service, a local-storage-setup application onto the node of the additional set of resources such that the local-storage-setup application is executed to generate a local storage object that enables the application container to utilize the local storage.

5. The method of claim 4, further comprising:

binding, by the orchestration service, the deployment object to the local storage object to cause, in response to the application container crashing, the orchestration service to redeploy the application container onto the node of the additional set of resources.

6. The method of claim 2, wherein causing the allocation of the additional set of resources includes issuing a set of requests to a cloud service to allocate the node of the additional set of resources and the external storage to the target environment, wherein the target environment is part of cloud infrastructure that is managed by the cloud service.

7. The method of claim 1, further comprising:

detecting, by the orchestration service, that the deployment object indicates the pending state for the application container;

in response to the detecting, the orchestration service identifying whether there exists an available resource in the target environment on which to deploy the application container, wherein the deploying of the application container is performed in response to identifying the additional set of resources; and after the deploying of the application container, the orchestration service modifying the deployment object to indicate that the application container has been deployed.

8. The method of claim 1, further comprising:

detecting, by the orchestration service, that the node of the additional set of resources has crashed; and subsequent to the detecting, the orchestration service deleting a volume object created for an external volume associated with the node of the additional set of resources, wherein the deleting causes the orchestration service to allocate another set of additional resources to the target environment.

9. The method of claim 1, wherein a number of placeholder containers deployed is scaled in proportion to a number of application containers deployed for the distributed service.

10. The method of claim 1, wherein the second mode corresponds to a dynamic provisioner mode associated with a Kubernetes platform, and wherein the first mode corresponds to a no-provisioner mode.

11. A non-transitory computer readable medium having program instructions stored thereon that are capable of causing a computer system to perform operations comprising:

receiving a first request to deploy, for a distributed service, an application container onto a set of resources of a target environment such that program code of the application container is executed to implement at least a portion of the distributed service;

storing a deployment object that indicates a state of a deployment of the application container, wherein the deployment of the application container is carried out in a first mode in which the computer system does not allocate a node to the target environment on which to execute the application container even when the application container is associated with a pending state and has not been deployed onto the target environment as a set of resources requested for the application container is not available in the target environment;

subsequent to receiving the first request to deploy the application container, receiving a second request to deploy, for a placeholder service, a placeholder container onto the target environment, wherein a deployment of the placeholder container is carried out in a second mode in which the computer system allocates resources that include a node for the deployment of the placeholder container;

causing an allocation of an additional set of resources to the target environment on which to execute program code of the placeholder container; and subsequent to the additional set of resources being allocated for the placeholder container, deploying the application container onto a node of the additional set of resources for execution.

12. The non-transitory computer readable medium of claim 11, wherein the operations further comprise:

creating a storage object for the application container;

deploying, onto the node of the additional set of resources, a local-storage-setup application to create a local storage object representing a local storage of the node of the additional set of resources; and binding the storage object of the application container to the local storage object created by the local-storage-setup application, wherein the binding permits the application container to utilize the local storage and causes the computer system to deploy the application container onto the node of the additional set of resources.

13. The non-transitory computer readable medium of claim 11, wherein the additional set of resources includes an external storage that is external to the node of the additional set of resources, and wherein the operations further comprise:

deploying the placeholder container onto the node of the additional set of resources, wherein the placeholder container is operable to utilize the external storage while the application container is operable to utilize a local storage included in the node of the additional set of resources.

14. The non-transitory computer readable medium of claim 11, wherein the operations further comprise:

detecting that the deployment object indicates the pending state for the application container;

in response to the detecting, identifying whether there exists an available resource in the target environment on which to deploy the application container, wherein the deploying of the application container is performed in response to identifying the additional set of resources; and subsequent to deploying the application container, modifying the deployment object to indicate that the application container has been deployed.

15. A system, comprising:

at least one processor; and memory having program instructions stored thereon that are executable by the at least one processor to cause the system to perform operations comprising:

receiving a first request to deploy, for a distributed service, an application container onto a set of resources of a target environment such that program code of the application container is executed to implement at least a portion of the distributed service;

storing a deployment object that indicates a state of a deployment of the application container, wherein the deployment of the application container is carried out in a first mode in which the system does not allocate a node to the target environment on which to execute the application container even when the application container is associated with a pending state and has not been deployed onto the target environment as a set of resources requested for the application container is not available in the target environment;

subsequent to receiving the first request to deploy the application container, receiving a second request to deploy, for a placeholder service, a placeholder container the target environment, wherein a deployment of the placeholder container is carried out in a second mode in which the system allocates resources that include a node for the deployment of the placeholder container;

causing an allocation of an additional set of resources to the target environment on which to execute program code of the placeholder container; and subsequent to the additional set of resources being allocated for the placeholder container, deploying the application container onto a node of the additional set of resources for execution.

16. The system of claim 15, wherein the operations further comprise:

detecting that the deployment object indicates the pending state for the application container;

in response to the detecting, identifying whether there exists an available resource in the target environment on which to deploy the application container, wherein the deploying of the application container is performed in response to identifying the additional set of resources; and subsequent to deploying the application container, modifying the deployment object to indicate that the application container has been deployed.

17. The system of claim 15, wherein the operations further comprise:

creating a storage object for the application container;

deploying, onto the node of the additional set of resources, a local-storage-setup application to create a local storage object representing a local storage of the node of the additional set of resources; and binding the storage object of the application container to the local storage object created by the local-storage-setup application, wherein the binding permits the application container to utilize the local storage and causes the system to deploy the application container onto the node of the additional set of resources.

18. The system of claim 15, wherein causing the allocation of the additional set of resources includes issuing a set of requests to a cloud service to allocate the node of the additional set of resources and an external storage to the target environment, wherein the target environment is part of cloud infrastructure that is managed by the cloud service.

19. The system of claim 15, wherein the additional set of resources includes an external storage that is external to the node of the additional set of resources, and wherein the operations further comprise:

deploying the placeholder container onto the node of the additional set of resources, wherein the placeholder container is operable to utilize the external storage while the application container is operable to utilize a local storage included in the node of the additional set of resources.

* * * * *